United States Patent [19]
Pettersson

[11] Patent Number: 5,736,839
[45] Date of Patent: Apr. 7, 1998

[54] THREE PHASE CONDUCTOR ARRANGEMENT

[75] Inventor: Per Pettersson, Vällingby, Sweden

[73] Assignee: Vattenfall AB, Stockholm, Sweden

[21] Appl. No.: 666,523

[22] PCT Filed: Jan. 31, 1995

[86] PCT No.: PCT/SE95/00089
§ 371 Date: Jul. 5, 1996
§ 102(e) Date: Jul. 5, 1996

[87] PCT Pub. No.: WO95/20835
PCT Pub. Date: Aug. 3, 1995

[30] Foreign Application Priority Data

Jan. 31, 1994 [SE] Sweden .......................... 9400304

[51] Int. Cl.⁶ .......................................... G05F 1/70
[52] U.S. Cl. .......................................... 323/213
[58] Field of Search .......................... 323/211–213; 363/44–48

[56] References Cited

U.S. PATENT DOCUMENTS 5,121,048  6/1992  Larsen ............................. 323/210

FOREIGN PATENT DOCUMENTS 2095056   9/1982  United Kingdom .
WOA18201294  4/1982  WIPO .

*Primary Examiner*—Aditya Krishnan
*Attorney, Agent, or Firm*—Christie, Parker & Hale, LLP

[57] ABSTRACT

Method for generating low magnetic fields from a three-phase conductor arrangement. Four phase conductors are used, one phase being split into two phase conductors which are arranged one on each side of the phase conductors of the unsplit phases in a planar phase arrangement. The two outer phase conductors are interconnected, thereby forming a loop. Capacitive elements can be arranged in the loop, preferably in loop-forming cross connections.

14 Claims, 4 Drawing Sheets

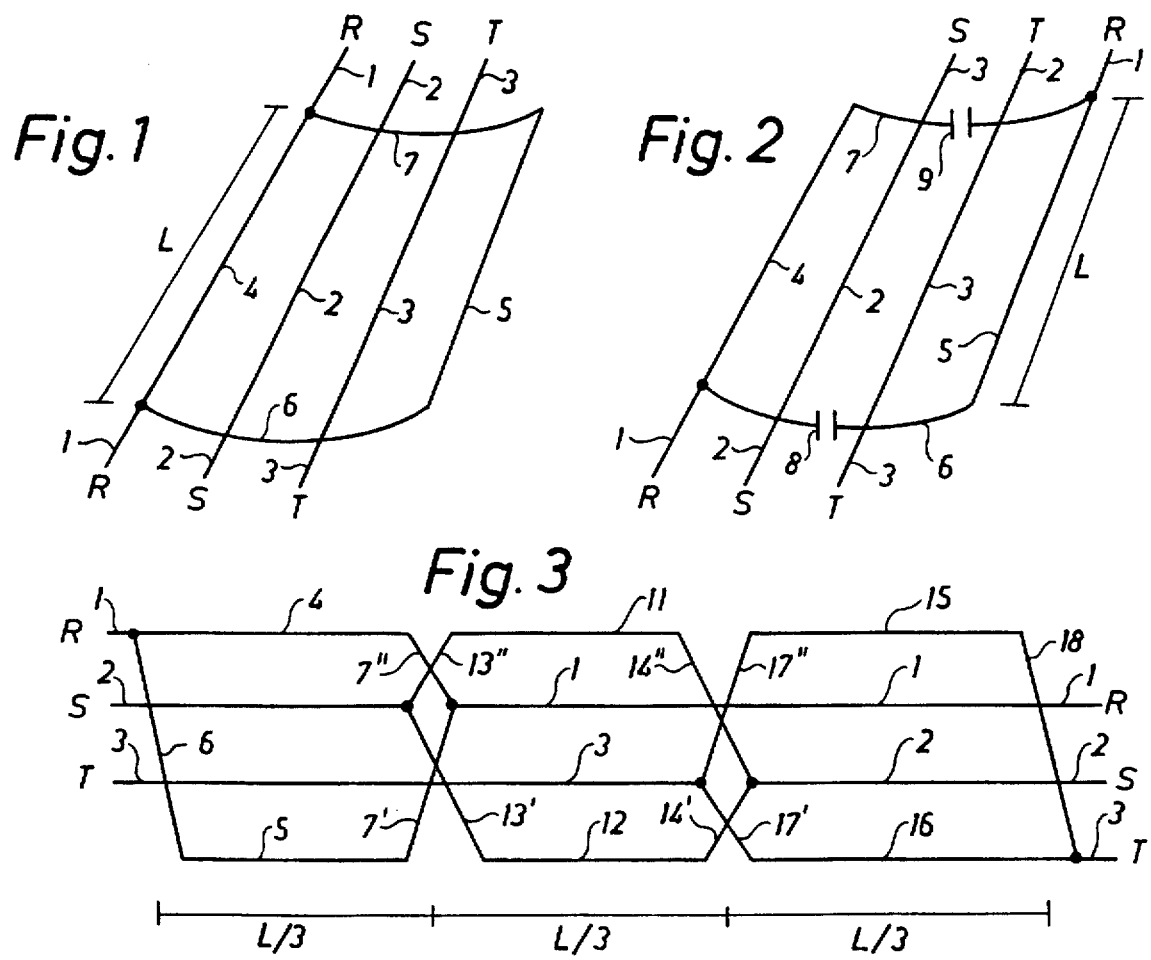

THREE PHASE CONDUCTOR ARRANGEMENT

TECHNICAL FIELD

The present invention generally relates to three-phase-conductor arrangements, and specifically to methods end arrangements using phase splitting and configuration of phase conductors for the primary purpose of obtaining a reduction of the magnetic field generated by a three-phase-conductor arrangement.

TECHNICAL BACKGROUND

Today it is common knowledge that it is desirable to reduce the magnetic field in the vicinity of three-phase-conductor arrangements, both in consideration of any effects on the health and in consideration of disturbing effects on electronic equipment. Typical three-phase-conductor arrangements are in this context, for example, overhead and underground power lines, bus bar systems in substation switch gears and generator bus bars in power plants and the like.

Regarding overhead lines, attempts have been made to reduce the generated magnetic field by different kinds of symmetrical phase conductor arrangements comprising split phases having five or six phase conductors, implying that two and, respectively, three phases have been split into two phase conductors each. This results in costly and extensive arrangements.

Particular problems arise in connection with existing three-phase-conductor arrangements having three phase conductors, which in many cases cannot be rebuilt in a reasonable manner for reducing the generated magnetic field.

OBJECTS OF THE INVENTION

The main object of the present invention is to provide a method for reducing in a simple, inexpensive and effective manner the magnetic field from a three-phase-conductor arrangement.

Another object of the present invention is to provide a method for magnetic field reduction, which does not require extensive symmetrical phase conductor configurations.

A further object of the present invention is to provide a method for magnetic field reduction, which is very well adapted for use in existing three-phase arrangements having three phase conductors in planar configuration.

One more object of the invention is to provide a method which renders it possible, in addition to magnetic field reduction, to also alternatively easily use phase conductors in various conventional arrangements having three phase conductors.

One more object of the invention is to provide a method which makes it possible, in a three-phase arrangement for transmission over long distances, to simultaneously increase the transmission capacity and reduce the generated magnetic field as compared with a conventional arrangement having three phase conductors.

SUMMARY OF THE INVENTION

The above-mentioned objects are achieved by a method, an arrangement and a use having the features stated in the accompanying claims.

The invention thus is based on the knowledge that an unsymmetrical arrangement of four phase conductors, of which two are connected to one and the same phase and form a loop, surprisingly yields an essential magnetic field reduction as compared with a conventional arrangement of three phase conductors. The two "split" phase conductors are arranged each on one side of and outside the two phase conductors in the middle, which belong to the non-split phases. The loop is formed by connecting the two outer phase conductors with each other at least at the beginning and, respectively, at the end of the phase splitting. Connections can be carried out in a conventional manner. In overhead lines, they may consist of, for example, suspension cross-connecting conductors (slacks) in connection with suspension from used pole constructions. In bus bars, they consist naturally of the connecting bars of each cell, extending to the two split phase conductors.

In the inventive arrangement, the four phase conductors, seen transversely of the extent of the phase conductors, are thus arranged in an extended configuration, preferably at least essentially planar or straight. The phase conductors are advantageously equidistantly spaced, the space between them being kept as small as possible, while considering the necessary requirements for insulation etc. The phase conductor arrangement can be essentially horizontal, vertical or inclined in general.

According to a first aspect of the invention, a substantial part of the magnetic field reduction is obtained by the currents which will circulate in an unscrewed loop formed of the outer phase conductors. The generating of these circulating currents can be promoted by connecting capacitive elements to the loop. Such capacitive elements, for example capacitors, are advantageously connected to the loop-forming connections, preferably symmetrically, i.e. in both connections forming a loop. In overhead lines, the capacitive elements may, for example, be suspended from cross-connecting conductors (slacks).

As compared with a planar phase arrangement having three phase conductors, use of the present invention implies that, in case of an unscrewed loop, the magnetic field can be reduced, in any case to about one third of the normal. If optimum compensation (about 60%) of the inductance of the loop by means of capacitive elements connected to the loop is used, a further halving of the magnetic field can be achieved. Totally seen, the magnetic field then decreases to about one sixth. The circulating current can then typically be about 20% of the phase current, as compared with about 10% in the uncompensated case.

In bar arrangements, the circulating current can be stimulated by giving the bars of the split phase large dimensions. It has been found that the field then decreases by approximately a factor eight, even without compensation.

It will be appreciated that the present invention can advantageously be used to reduce in a controlled manner the magnetic field from a special distance of a power line having a conventional planar arrangement of three phase conductors by rebuilding the distance involved according to the present method.

In conventional overhead lines supported by portal-type line poles, it has in many cases proved to be possible to arrange the two unsplit phase conductors between the two pole legs of the respective line pole and the two phase conductors obtained by splitting, one on each outside of the two pole legs, while maintaining the requisite insulation between the phases and to the poles, respectively. This results in a halving of the phase distance, which yields an extra halving of the magnetic field, which totally decreases to about one twelfth, if maximum compensation is also utilised.

In buried lines, it may in many cases be relatively easy to arrange an additional phase conductor by the side of three conventionally arranged, spaced-apart parallel phase conductors and at a distance from the closest of said three phase conductors, which preferably equals approximately the mutual distance between said three phase conductors. The additional phase conductor is connected to the remotest phase conductor of said three further phase conductors so as to form the necessary loop. As a rule, the connections required do not constitute any problem, since cable-type phase conductors are involved, i.e. insulated phase conductors that may intersect each other without any problems.

Also in conjunction with bar-type phase conductors there are, as a rule, no difficulties in arranging an additional bar in parallel with three bars which constitute a conventional bar arrangement.

It will be appreciated quite easily that the invention may be used both for new constructions and for reconstructions. Especially fox long lines, it is convenient to use screwing for the purpose of reducing the disequilibrium between the impedances of the different phases. Such screwing may be easily effected by splitting the three phases one after the other according to the invention along preferably equally long line portions. As compared with a conventional arrangement with three phase conductors in planar configuration, a screwed arrangement according to the invention yields about 20% lower inductive reactance without compensation and about 30% lower inductive reactance with optimum compensation. This results in an increase of the transmission capacity by about 25% without compensation and by about 50% with optimum compensation. The losses at the same total conductor cross-section will be insignificantly greater if each of the outer phase conductors has a cross-section which is at least half of the cross-section of the other two phase conductors.

According to a second aspect of the invention, a magnetic field reduction can be achieved, while avoiding losses, which may be especially advantageous in conjunction with line arrangements for transmission over long distances. Then use is made of screwed loops together with line screwing of the type mentioned above. Screwed loops mean that circulating currents in the loops are avoided, at the same time as it has surprisingly been found that the inductive reactance does not seem to be affected to any considerable extent. The magnetic field reduction obtained is a halving compared with a conventional three-conductor arrangement, and the transmission capacity increases by about 25%. If loop compensation is also utilised, which is possible, the transmission capacity increases still more.

A further favourable effect of the four-conductor arrangement according to the invention is that the short-circuit forces acting on the conductors will become low. Compared with a common, planar three-conductor arrangement, it appears that the forces in a three-phase short-circuit decrease by about 40% in the power line case and by about 50% in the bar case even without compensation. With compensation, the decrease will be considerably above 50% in both cases.

The use of four phase conductors according to the invention, however, also implies redundancy conditions, which may be used to provide, if necessary, various alternative configurations of arrangements with only three phase conductors. This can render continued operation possible if a phase conductor has To be temporarily taken out of operation, for example owing to a fault, service or the like. The necessary phase switching and breaking/switching of transverse connections must, of course, be carried out. The preparations for this can be made in a switch gear or in some other suitable place.

When using the inventive connecting possibility, may in some cases be convenient to give The two outer phase conductors at least the same cross-section as the two other phase conductors, for an overall optimising purpose.

The use of four phase conductors according to the invention may, in conjunction with overhead lines, in some cases result in simplified wiring, since the conductors can be suspended in pairs from two separate poles, one conductor on either side of each pole, which yields great flexibility.

A conductor arrangement designed according to the invention also has the advantage of being convertible into direct-current transmission, the four conductors being used for two dipoles with two conductors each.

The invention will now be described in more detail by means of some embodiments, reference being made to the accompanying drawing.

BRIEF DESCRIPTION OF THE DRAWINGS

FIG. 1 schematically illustrates a basic embodiment of the invention.

FIG. 2 schematically illustrates a further embodiment of the invention, with a compensated loop.

FIG. 3 schematically illustrates a third embodiment of the invention, which uses screwing.

DESCRIPTION OF PREFERRED EMBODIMENTS

Figure 4:
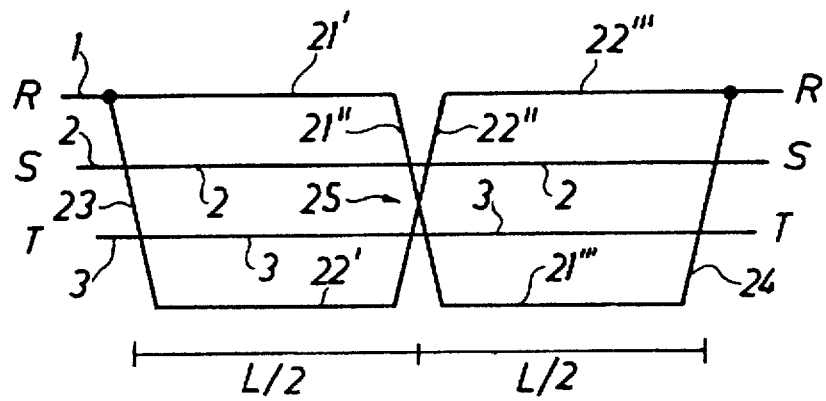
FIG. 4 schematically illustrates a fourth embodiment of the invention, in which loop screwing is used.

FIG. 1 illustrates how the present invention is used over a line portion L for reduction of the magnetic field generated by the conductor arrangement which comprises three phases R, S, T. Three input phase conductors 1, 2, 3 extend in parallel in a planar phase arrangement. At the beginning of the line portion L, the R phase conductor 1 is split into two phase conductors 4, 5 extending in parallel with the S and T phase conductors 2, 3 and on either side thereof, while maintaining the planar phase arrangement and with unchanged, equal mutual distance between the phase conductors 2, 3, 4, 5. At the end of the line portion L, the phase conductors 4, 5 are joined such that the R phase conductor 1 is resurrected.

In the embodiment shown, the phase conductor 4 is a direct extension of the input phase conductor 1, and at the end of the line portion L, the output phase conductor is a direct extension of the phase conductor 4. The phase conductor 5 is connected to the beginning and, respectively, to the end of the phase conductor 4 by cross connections 6 and 7, respectively. In conjunction with overhead lines, the cross connections. 6, 7 are, as will be immediately appreciated, suitably designed as hanging slacks arranged in connection with a line-supporting pole construction.

It will be appreciated that the output phase conductor 1 could alternatively be a direct extension of the phase conductor 5.

Figure 5:
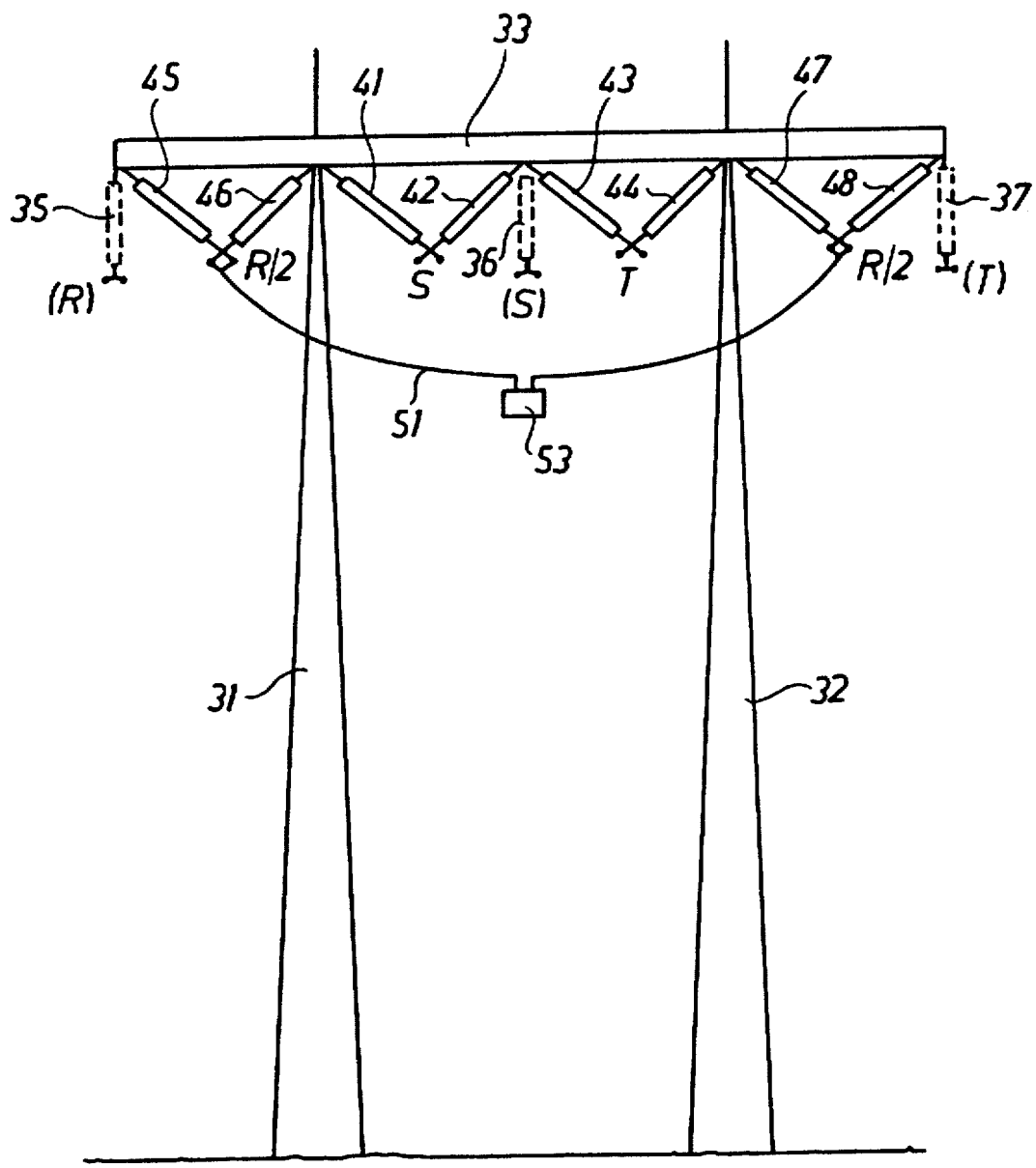
FIG. 5 schematically illustrates an example of a reconstruction of a conventional three-conductor arrangement into a four-conductor arrangement according to one embodiment of the invention.

FIG. 2 illustrates how it is possible, in an embodiment of the general type as shown in FIG. 1, to compensate for the inductance in the loop that is formed by the conductors 4, 5, 6 and 7. The compensation is provided by capacitive elements 8, 9 being connected to the cross connections 6 and 7, respectively. These elements may consist of, for instance, capacitors suspended in slacks, as illustrated in FIG. 5.

In the embodiment of FIG. 2, the output R phase conductor 1 starts from the opposite side compared with the embodiment of FIG. 1. In other words, it is a direct extension of the phase conductor 5. As is directly apparent, this results in an improved symmetry, while the two capacitive elements 8, 9 are arranged each in one loop half.

FIG. 3 illustrates an embodiment, showing how screwing can be applied when using the present invention, for the purpose of reducing impedance disequilibrium. In the case illustrated, a basic arrangement as shown in FIG. 1 is assumed. The R, S and T phases are in turn split each along a section L/3. The R phase is split as shown in FIG. 1, although the cross connection 7 has two parts 7' and 7". The S phase 2 is, correspondingly, split into two phase conductors 11, 12 by means of cross connections 13', 13" and 14', 14", respectively, while the T phase 3 is split into two phase conductors 15, 16 by means of cross connections 17', 17" and 18, respectively.

FIG. 4 schematically illustrates an example of using the invention in conjunction with a screwed loop. Here, the R phase is split into two phase conductors 21, 22 which form a screwed loop together with end cross connections 23, 24 of the same type as in FIG. 1. In other words, the loop has the general configuration of an eight, the transverse central loop portions 21", 22" which intersect each other at 25, however, not being in contact with each other. The cross connections 21", 22" are positioned in the middle of the line portion L and may be designed in a manner similar to the cross connections 23, 24. This loop design does not produce any circulating currents and, consequently, no loop losses, at the same time as the inductive reactance does not increase significantly.

FIG. 5 illustrates how a 220 kV power line having three phase conductors can be rebuilt according to the present invention so as to produce lower magnetic fields. Here, the conductors are suspended from a portal-type line pole comprising two poles 31, 32 and one crossbeam 33. Dashed lines indicate the conventional suspension of the three phase conductors R, S and T from insulators 35, 36 and 37. In rebuilding to an embodiment according to FIG. 2, it has been found to be possible to reduce the phase distance by half, while maintaining the necessary insulation. This means that two phase conductors S and T can be suspended symmetrically between the poles 31, 32, suitably in angular insulator pairs 41; 42 and 43, 44, respectively. The third phase R is split and the two resulting phase conductors R/2 are suspended on either side outside the poles 31, 32, also suitably in angular insulator pairs 45, 46 and 47, 48 respectively. The mutual distance between the phase conductors S and T equals the distance between these phase conductors and the respective exterior phase conductors R/2 and T/2.

The two outer phase conductors R/2 and T/2 are interconnected by a cross connection 51 in the form of a slack conductor, in whose lowest part a capacitor 53 is connected.

Figure 6:
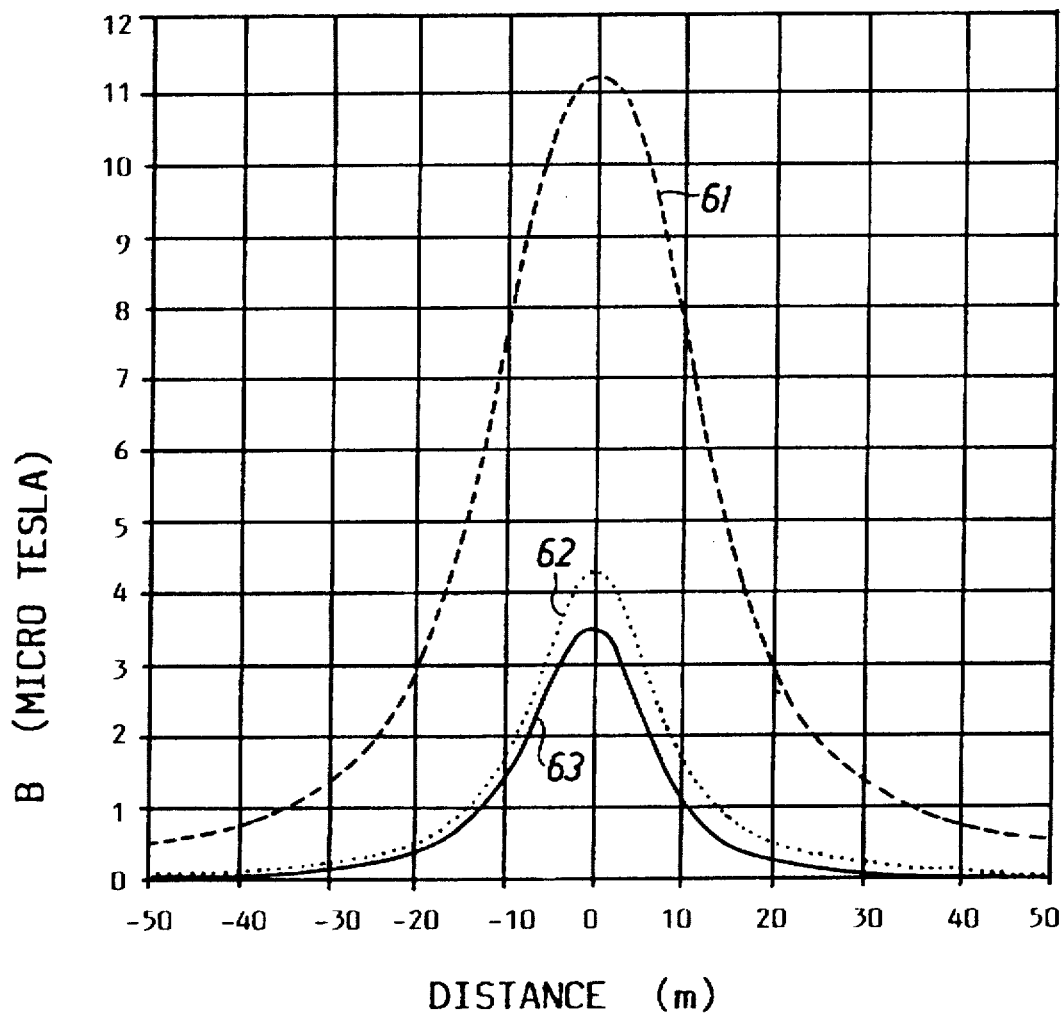
FIG. 6 is a diagram illustrating the magnetic field reduction obtained in a reconstruction according to FIG. 5.

FIG. 6 shows graphs of the strength of the generated magnetic field as a function of the distance laterally from a line of symmetry of the conductor arrangement, measured at a distance from the ground of 1.5 m. The graph 61 illustrates the magnetic field from the conventional three-conductor arrangement. The graph 62 illustrates the magnetic field from the four-conductor arrangement obtained after the reconstruction, however without compensation, i.e. without capacitors 53. The graph 63 illustrates the corresponding magnetic field with compensation, i.e. the capacitors 53 being connected. As is directly apparent, an extremely good reduction of the magnetic field is obtained. In the embodiment shown, the effected halving of the phase distance also contributes, viz. a halving of the magnetic field.

Figure 7:
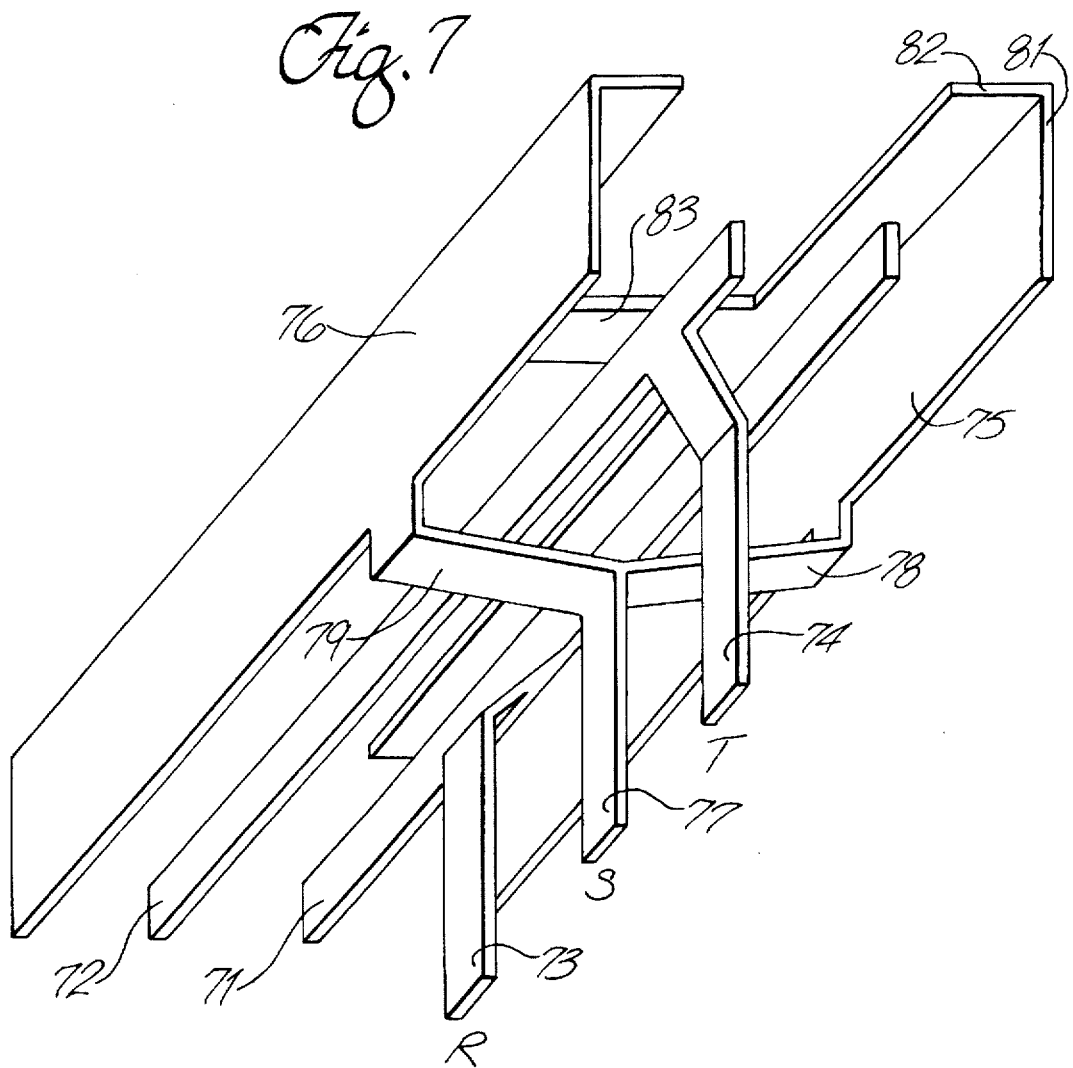
FIG. 7 is a schematic perspective view of an embodiment of a bus bar arrangement according to the invention.

FIG. 7 illustrates a section of a bus bar arrangement according to the present invention. The bar arrangement comprises two centrally positioned conventional bars 71, 72 which are connected to the R phase and the T phase, respectively, via upright connecting bars 73, 74, respectively. The S phase is split into two outer bars 75, 76 which are connected to an upright connecting bar 77 via bar portions 78, 79 extending in opposite directions from the bar 77. The bars 77, 78 and 79 are together of essentially Y configuration. Simultaneously, the bars 78, 79 constitute a mutual connection between the outer bars 75, 76.

The bars 75, 76 have an angular configuration with a vertical portion 81 which (in vertical direction) is wider than the bars 73, 74, and a horizontal portion 82 extending inwardly from the upper edge of the vertical portion 81. The portions 82 are interconnected by cross connections 83, suitably in any case in positions corresponding to the cross connection 78, 79. As will be immediately appreciated, this bar arrangement is very stable, at the same time as the two outer bars have advantageously great dimensions.

I claim:

1. A method for reducing magnetic fields generated by a three phase electric conductor arrangement, said arrangement comprising first, second and third conductors, each conductor having a different phase, the method comprising the steps of:

splitting the first conductor into two conductors;

connecting the two conductors in a loop; and positioning the second and third conductors between the two conductors.

2. The method of claim 1 further comprising the step of situating each of the conductors in a substantially planar arrangement.

3. The method of claim 1 or 2 further comprising the step of arranging each of the conductors at substantially equal distances from one another.

4. The method of claim 1 or 2 further comprising the step of adding capacitive elements in the loop.

5. The method of claim 1 or 2 further comprising the steps of:

reconnecting the two conductors into the first conductor;

splitting the second conductor into a second two conductors;

connecting the second two conductors in a loop; and positioning the first and third conductors between the second two conductors.

6. The method of claim 5 wherein the two conductors have a length substantially equal to a length of the second two conductors.

7. The method of claim 1 or 2 wherein the conductors are supported by a portal-type line pole having two poles, further comprising the steps of situating the second and third conductors between the two poles and situating the two conductors outside the two poles with one conductor of the two conductors on one side of the two poles and the other conductor of the two conductors on an opposing side of the two poles.

8. The method of claim 1 or 2 further comprising the step of arranging the two conductors such that one of the two conductors together with the second and third conductors constitute a three-phase conductor arrangement.

9. The method of claim 1 or 2 wherein each of the conductors have essentially the same cross sectional area.

10. A method for reducing magnetic fields generated by an underground three phase electric conductor arrangement, said arrangement comprising first, second and third conductors, said second conductor being disposed between said first and third conductor, each of the three conductors having a different phase, the method comprising the steps of:

placing a fourth conductor next to the third conductor at a distance approximately equal to a mutual distance between the first, second and third conductors; and connecting the fourth conductor to the first conductor in a loop.

11. A three-phase electric conductor arrangement, comprising:

a first conductor having a first phase, said first conductor being split into two conductors, and said two conductors being connected in a loop;

a second conductor having a second phase, said second conductor being disposed between said two conductors; and a third conductor having a third phase, said third conductor being disposed between said two conductors.

12. The arrangement of claim 11 wherein the conductors are substantially coplanar.

13. The arrangement of claim 11 or 12 wherein the loop comprises inductance, and further comprising capacitive elements placed in the loop to compensate for the inductance.

14. A three-phase electric conductor arrangement, comprising:

a first conductor having a first phase, said first conductor having first and second portions, said first portion of the first conductor comprising a first pair of conductors connected in a loop;

a second conductor having a second phase, said second conductor having first and second portions, said second portion of the second conductor comprising a second pair of conductors connected in a loop, the first portion of the second conductor being disposed between the first pair of conductors, and the second portion of the first conductor being disposed between the second pair of conductors; and a third conductor having a third phase, said third conductor being disposed between the first and second pair of conductors.

* * * * *